United States Patent [19]

Schwenninger

[11] Patent Number: 4,819,859

[45] Date of Patent: Apr. 11, 1989

[54] LAMINATION OF OXIDE DISPERSION STRENGTHENED PLATINUM AND ALLOYS

[75] Inventor: Ronald L. Schwenninger, Ridgeley, W. Va.

[73] Assignee: PPG Industries, Inc., Pittsburgh, Pa.

[21] Appl. No.: 135,108

[22] Filed: Dec. 18, 1987

[51] Int. Cl.$^4$ .................. B23K 20/00; B23K 20/22; B23K 20/24; C03B 37/00

[52] U.S. Cl. .................................. 228/190; 228/193; 228/263.11; 228/173.6; 65/374.11; 65/374.12; 428/940; 428/637; 428/670; 420/466

[58] Field of Search ............... 228/190, 193, 237, 238, 228/242, 243, 263.11, 116, 173.6; 65/324, 374.11, 374.12; 428/940, 637, 670; 420/466

[56] References Cited

U.S. PATENT DOCUMENTS

| | | |
|---|---|---|
| 2,843,646 | 7/1958 | Conant . |
| 3,137,927 | 6/1964 | Huegel et al. . |
| 3,139,682 | 7/1964 | Grant . |
| 3,310,438 | 3/1967 | Huffman et al. . |
| 3,346,427 | 10/1967 | Baldwin et al. . |
| 3,388,010 | 6/1968 | Stuart et al. . |
| 3,466,735 | 9/1969 | Emmert .............................. 228/193 |
| 3,557,983 | 1/1971 | Hayes et al. . |
| 3,559,276 | 2/1971 | Anderson . |
| 3,618,843 | 11/1971 | Hayes et al. . |
| 3,709,667 | 1/1973 | Selman et al. . |
| 3,714,702 | 2/1973 | Hammond .......................... 228/193 |
| 3,816,080 | 6/1974 | Bomford et al. . |
| 3,840,983 | 10/1974 | Ryff . |
| 3,942,231 | 3/1976 | Whitaker ............................. 228/193 |
| 4,208,209 | 6/1980 | Sor . |
| 4,252,558 | 2/1981 | Touboul et al. . |
| 4,478,787 | 10/1984 | Nadkarni et al. . |
| 4,722,469 | 2/1988 | Rydstad et al. ..................... 228/193 |

FOREIGN PATENT DOCUMENTS 0028976  5/1981  European Pat. Off. ............ 228/193

OTHER PUBLICATIONS

Heywood, A. E., "Zirconia Grain Stabilized Platinum Alloys," Johnson Matthey Metals, Ltd., Wembley, Middlesex, England, publication unknown.

Weber, "Oxide-Dispersion Strengthened Platinum and Platinum Alloys for Glass Industry," Comptoir Lyon Alemand Louyot, Paris, France, Dec. 1985.

Primary Examiner—Nicholas P. Godici
Assistant Examiner—Samuel M. Heinrich
Attorney, Agent, or Firm—Dennis G. Millman

[57] ABSTRACT

Relatively large structures are fabricated from oxide dispersion strengthened platinum or alloys by working a plurality of pieces to thin, wide layers, and then laminating the layers such as by hammer welding so as not to disturb the grain structure or oxide dispersion.

20 Claims, No Drawings

LAMINATION OF OXIDE DISPERSION STRENGTHENED PLATINUM AND ALLOYS

BACKGROUND OF THE INVENTION

Platinum has long been known as a nearly ideal material for fabricating structures that are in contact with molten glass. Not only is platinum resistant to corrosion from the molten glass, but it also resists oxidation at the high temperatures involved in melting glass. A drawback to platinum, however, is that its strength at high temperatures is not as great as would be desired, and prolonged exposure to high temperatures leads to a degradation of its strength. Providing greater thickness to offset the shortcomings in strength is prohibited by the very high cost of platinum. Higher service temperatures have been made feasible by the use of platinum alloys such as platinum/rhodium, but these alloys do not solve the problem of strength reduction over time. Furthermore, rhodium is even more costly than platinum.

When platinum or a platinum alloy is maintained at elevated temperatures for an extended period of time, loss of strength occurs due to the process of recrystallization. Growth of grains during recrystallization significantly reduces strength because slippage (or "creep") can occur more readily at the boundary between large grains, resulting in failure of the piece. Growth of very large grains sometimes occurs so that the grain boundaries span the entire thickness of the piece, thereby creating a major weakness in the piece.

It was previously found that the high temperature service life of platinum could be increased by means of a dispersed phase of stable refractory oxides within the platinum. Oxides typically employed as the dispersed phase include zirconia ($ZrO_2$), thoria ($ThO_2$) and yttria ($Y_2O_3$). The presence of the dispersed oxide at the grain boundaries of the platinum inhibits grain growth. This in turn increases the resistance to creep. Oxide dispersion strengthening also serves to improve corrosion resistance of platinum from attack by other metals such as iron or molybdenum. Reference to oxide dispersion strengthened platinum and methods for its manufacture may be found in U.S. Pat. Nos. 3,139,682 (Grant), 3,709,667 (Selman et al.) and 4,252,558 (Touboul et al.). Oxide dispersion strengthened platinum is made by first preparing an alloy with a major portion of platinum (or platinum/rhodium alloy) and a minor portion of metal or metal oxide to be dispersed. If the minor portion is not already oxidized, the alloy is subjected to a treatment that oxidizes the dispersed metal to its oxide within the body of the alloy. The material is then subjected to cold or hot working (rolling, drawing, or forging) so as to impart the desired grain characteristics.

Unfortunately, the manufacturing techniques for oxide dispersion strengthened platinum limit the size of article that can be fabricated from a single piece of the material. In general, it is desirable to avoid joints in equipment for contact with molten glass, so fabrication from the minimum number of pieces is preferred. Welding oxide dispersion strengthened platinum is precluded because heating an area of the metal to its melting point during welding causes that area to lose the dispersion effect, thereby creating an area of weakness at the weld. Hammer welding (impact bonding at elevated temperatures below melting) has been employed to close seams without destroying the dispersion strengthening, but using seams extensively to fabricate a structure is undesirable because of the potential for failure at the seams. A structure requiring a relatively large wall thickness also prohibits attaining the full extent of strengthening by working the metal since the thickness requirement limits the extent of working.

SUMMARY OF THE INVENTION

It is an object of the present invention to employ oxide dispersion strengthened platinum or platinum alloys to fabricate relatively large structures suitable for use in contact with molten glass or the like, within the restrictions of limited ingot sizes presently available, and while realizing the strength enhancement capabilities of the material. The ingot of oxide dispersion strengthened platinum is worked to a sheet size suitable for fabricating the structure, but to a thickness that is a fraction of the intended wall thickness for the structure. Several layers are then laminated to produce the desired wall thickness. Each layer is therefore subjected to a large amount of working, which enhances the strength of the oxide dispersion strengthened material. Additionally, the layers after being worked have sufficiently large area to fabricate a large structure with a minimum number of seams. Any seams that may be present in a layer can be offset from seams in the other layers of the laminate so as to conceal the seams from exposure. The layers may be attached to each other by hammer welding, i.e., impact bonding below the temperature at which the alloy melts. Increasing the number of layers and reducing their thickness increases the potential benefits of the present invention, and therefore the invention encompasses laminations of two or more layers with theoretically no upper limit. The resulting laminated articles exhibit strength and durability superior to that of articles fabricated from unstrengthened platinum alloys having much greater wall thicknesses.

DETAILED DESCRIPTION

As used herein, "platinum" is intended to include pure platinum as well as alloys of platinum. Rhodium is commonly alloyed with platinum for molten glass contact applications, typically in amounts of 10 to 20 percent by weight of the alloy. Iridium and palladium are other metals that are sometimes alloyed with platinum. Traces of impurities may also be present.

Oxide dispersion strengthened platinum is commercially available, and techniques for its manufacture are disclosed in U.S. Pat. Nos. 3,709,667 (Selman et al.) and 4,252,558 (Touboul et-al.), both of which are hereby incorporated by reference. In order to achieve a thorough dispersion of the refractory oxide the Selman method employs powder metallurgy and sintering, and the Touboul method uses flame spraying. In either technique, the dispersed refractory oxide constitutes a very minor portion of the alloy, ranging from about 0.01 percent to 5 percent by weight. Oxide concentrations at the low end of the range (less than 0.5 percent by weight) are preferred for the sake of better workability of the alloy. A large number of oxides are theoretically capable of serving as the dispersed phase, and the present invention is not limited to any particular oxide or group of oxides, but commercially available dispersion strengthened platinum usually employs zirconia, yttria, or thoria.

Substantial additional strengthening is imparted to oxide dispersion strengthened platinum by working the ingot by forging, rolling, or drawing while the material is either cold or hot (but below the melting point. The strength is improved by working the metal so as to produce long, narrow grains or wide, thin grains. Therefore, starting with a short, thick ingot, it is beneficial to work the metal to a long, thin or wide, thin configuration. The present invention permits the strengthening of this stage of the process to be utilized to its fullest extent since the present invention calls for the alloy to be worked to a much smaller thickness than the intended wall thickness of the article to be fabricated, thus permitting greater elongation of the grains. Additionally, an ingot of limited size can be worked to a relatively large area when thickness is not a restraint, thereby permitting large articles to be fabricated with fewer joints or seams. Employing a single layer of the reduced thickness material would not be suitable for the type of structures involved because the thin material would not have sufficient stiffness to withstand the normal stresses encountered in their intended uses. Laminating several thin layers in accordance with the present invention, however, provides the degree of stiffness required while retaining the advantages of the thinly worked layers.

The number of layers to be worked and laminated will vary, and the degree of benefit attained with vary accordingly, but obviously a minimum of two layers is required for the principle of the invention to apply. For a given wall thickness of a structure, increasing the number of layers in the laminate and decreasing the thickness of each layer should yield greater improvements with no theoretical limit. But in practice, the increased processing costs as the layers are made thinner and more numerous will at some point not be justified by the increment of improvement yielded. This point will vary from case to case. Generally, the strengthening effect of the working step is significant only when a typical ingot has been worked to a thickness less than two millimeters and preferably less than one millimeter. If these are considered as the preferred maximum thicknesses for each layer, the minimum number of layers in a lamination of a given thickness will be determined. Being a relatively malleable metal, platinum can be worked to very small thicknesses, essentially limited only by the difficulty of handling very thin layers. Therefore, layer thicknesses as small as 0.015 inches (0.38 millimeter) are considered well within the practical range for the purposes of this invention, and layers as thin as 0.005 inches (0.13 millimeter) may be feasible. The total thickness of the lamination may be approximately the same as would have been specified for fabricating the article from a single thickness of the same platinum alloy. Thus, in an application calling for a platinum thickness of 3 millimeters, the lamination could consist of three layers 1 millimeter thick, or four layers 0.75 millimeters thick, or eight layers 0.375 millimeters thick, and so on. However, in view of the enhanced strength of the laminations of the present invention, the total laminate thickness may be reduced in comparison to non-laminated alloys to achieve the same degree of strength and durability, and substantially reduced compared to platinum alloys not including dispersed oxides.

The layers of worked platinum are bonded together in the laminate by the process known as hammer welding, wherein the surfaces are pressed together at elevated temperatures. The material is heated, to a temperature in the hot working or forging range. The maximum temperature will vary for different alloys. For unalloyed platinum the temperature would be below the melting point of 3215° F. (1769° C.). In general, hammer welding would entail temperatures greater than 2000° F. (1100° C.) and preferably greater than 2200° F. (1200° C.). The force to bond the surfaces may be applied by localized impact means such as a hammer employed manually or in a hammering machine or by rolling.

In a particular example, a tube for draining molten glass having a 1.75 inch (44.45 millimeter) inside diameter had a required nominal wall thickness of one eighth inch (3 millimeters). At a length of over 13 inches (34 centimeters), such a structure would have been too large to fabricate from a single ingot. Moreover, working the ingot to the intended wall thickness would have provided insufficient elongation of the grain structure to yield the desired strength characteristics. In accordance with the present invention, the tube was fabricated from four sheets of yttria stabilized 90% platinum, 10% rhodium alloy, each worked to a thickness of 0.030 inch (0.76 millimeter). The alloy was yttria stabilized 90% platinum 10% rhodium. The sheets were formed into a tube over a mandrel, with each sheet laminated over the previous sheet and hammer welded together. The longitudinal seams were hammer welded and offset 90 degrees from each other. The tube of this example was used in contact with molten glass, serving in place of an unstrengthened, monolithic tube of 80% platinum and 20% rhodium having a wall thickness of ¼ inch (6 millimeters).

I claim:

1. A method of fabricating an article of oxide dispersion strengthened platinum comprising:
   from a relatively thick mass of platinum or platinum alloy having a minor oxide phase dispersed therein, working the mass to a thin layer so as to elongate the grains of the metal microstructure; and
   superimposing a plurality of similarly worked layers with a joint in each layer offset from a joint in an adjacent layer, and bonding the layers below the melting point so as to form an article that is laminated substantially throughout its extent.

2. The method of claim 1 wherein the layers are bonded by hammer welding at an elevated temperature below the melting point.

3. The method of claim 1 wherein the minor dispersed phase comprises zirconia, yttria, or thoria.

4. The method of claim 3 wherein the minor dispersed phase comprises 0.01 to 5 percent by weight of the platinum or platinum alloy.

5. The method of claim 3 wherein the minor dispersed phase comprises less than 0.5 percent by weight of the platinum or platinum 6. The method claim 1 wherein each layer is worked to a thickness less than two millimeters.

7. The method of claim 1 wherein each layer is worked to a thickness less than one millimeter.

8. The method of claim 1 wherein at least four layers are bonded in the laminate.

9. An article comprising in its major portion a plurality of laminated layers of oxide dispersion strengthened platinum or platinum alloy that have been worked to elongate the grain structure and with a joint in each layer offset from a joint in an adjacent layer.

10. The article of claim 9 wherein the dispersion comprises zirconia, yttria, or thoria.

11. The article of claim 9 wherein the alloy includes rhodium.

12. The article of claim 9 wherein the layers are less than two millimeters in thickness.

13. The article of claim 9 wherein the layers are less than one millimeter in thickness.

14. The article of claim 9 wherein the laminate includes at least four layers.

15. The article of claim 9 wherein at least some of the layers include seams, and the seams are offset from each other.

16. A method of fabricating an article of oxide dispersion strengthened platinum having a desired thickness comprising:

from a relatively thick mass of platinum or platinum alloy having a minor oxide phase dispersed therein, working the mass to a layer having a thickness that is a fraction of the desired thickness for the article so as to elongate the grains of the metal microstructure; and superimposing a plurality of similarly worked layers so as to constitute the desired thickness and bonding the layers below the melting point so as to form an article of the desired thickness that is laminated substantially throughout its extent.

17. The method of claim 16 wherein the layers are bonded by hammer welding at an elevated temperature below the melting point.

18. The method of claim 16 wherein the minor dispersed phase comprises zirconia, yttria, or thoria.

19. The method of claim 16 wherein each layer is worked to a thickness less than two millimeters.

20. The method of claim 16 wherein at least four layers are bonded in the laminate.

* * * * *

UNITED STATES PATENT AND TRADEMARK OFFICE
CERTIFICATE OF CORRECTION

PATENT NO. : 4,819,859
DATED : April 11, 1989
INVENTOR(S) : Ronald L. Schwenninger It is certified that error appears in the above-identified patent and that said Letters Patent is hereby corrected as shown below:

Claim 5, line 3, after second occurrence of "platinum" insert --alloy--.

Signed and Sealed this

Seventh Day of August, 1990

*Attest:*

HARRY F. MANBECK, JR.

*Attesting Officer*   *Commissioner of Patents and Trademarks*